US012081780B2

United States Patent
Han et al.

(10) Patent No.: US 12,081,780 B2
(45) Date of Patent: Sep. 3, 2024

(54) ADVANCED TEMPORAL MOTION VECTOR PREDICTION

(71) Applicant: Qualcomm Incorporated, San Diego, CA (US)

(72) Inventors: Yu Han, San Diego, CA (US); Kai Zhang, San Diego, CA (US); Li Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/982,013

(22) PCT Filed: Mar. 19, 2018

(86) PCT No.: PCT/CN2018/079458
§ 371 (c)(1),
(2) Date: Sep. 17, 2020

(87) PCT Pub. No.: WO2019/178721
PCT Pub. Date: Sep. 26, 2019

(65) Prior Publication Data
US 2021/0099724 A1    Apr. 1, 2021

(51) Int. Cl.
*H04N 19/44*    (2014.01)
*H04N 19/105*   (2014.01)
(Continued)

(52) U.S. Cl.
CPC .......... *H04N 19/44* (2014.11); *H04N 19/105* (2014.11); *H04N 19/137* (2014.11); *H04N 19/159* (2014.11); *H04N 19/176* (2014.11)

(58) Field of Classification Search
None
See application file for complete search history.

(56) References Cited

U.S. PATENT DOCUMENTS 11,438,578 B2    9/2022  Chen et al.
11,539,958 B2   12/2022  Jang
(Continued)

FOREIGN PATENT DOCUMENTS

AU    2015200360 A1    2/2015
CN     103959791 A      7/2014
(Continued)

OTHER PUBLICATIONS

Chen J., et al., "Algorithm Description of Joint Exploration Test Model 7 (JEM7)", 7. JVET Meeting, Jul. 13, 2017-Jul. 21 2017, JVET-G1001-V1, Joint Video Exploration Team (JVET) of ITU-T SG 16 WP3 and ISO/IEC JTC 1/SC 29/WG 11, No. G1001_v1, JVET-G1001, 7th Meeting, Jul. 13, 2017-Jul. 21, 2017, Torino, IT, Aug. 19, 2017 (Aug. 19, 2017), XP030150980, 48 Pages, pp. i-iv, Retrieved from the Internet: URL: https://phenix.int-evry.fr/jvet/doc_end_user/documents/7_Torino/wg11/JVET-G1001-v1.zip JVET-G1001-v1.docx, [retrieved on Aug. 19, 2017] p. 20, Paragraph 2.3.7—p. 23, Paragraph 2.3.7.6, p. 17, Paragraph 2.3.5—p. 18, section 2, sections 2.1.1. 2.3.1 Abstract section "2.3.6. Affine motion compensation prediction" section "2.3.8. Bi-directional optical flow".
(Continued)

*Primary Examiner* — Chikaodili E Anyikire
(74) *Attorney, Agent, or Firm* — QUALCOMM Incorporated; Espartaco Diaz Hidalgo

(57) ABSTRACT

Methods and devices for decoding including a processor configured to determine which picture is a collocated picture, and determine a location of an associated block of the video data in the collocated picture that corresponds to the current block of video data in the current coding picture, based on using previously decoded blocks in the current coding picture to find an initial motion vector between the associated block in the collocated picture and the current block in the current coding picture, where the associated
(Continued)

block of the video data includes at least one first derived motion vector. The processor configured to determine at least one second derived motion vector associated with the current block in the current coding picture, when the initial motion vector points to the collocated picture, based on the at least on first derived motion vector associated with the associated block in the collocated picture.

30 Claims, 12 Drawing Sheets

(51) Int. Cl.
*H04N 19/137* (2014.01)
*H04N 19/159* (2014.01)
*H04N 19/176* (2014.01)

(56) References Cited

U.S. PATENT DOCUMENTS

| | | | |
|---|---|---|---|
| 11,671,587 B2 | 6/2023 | Zhang et al. | |
| 2004/0086047 A1* | 5/2004 | Kondo | H04N 19/517 375/E7.125 |
| 2013/0128970 A1 | 5/2013 | Yu et al. | |
| 2014/0192883 A1* | 7/2014 | Seregin | H04N 19/33 375/240.16 |
| 2016/0286232 A1* | 9/2016 | Li | H04N 19/57 |
| 2017/0332099 A1* | 11/2017 | Lee | H04N 19/52 |
| 2018/0352223 A1* | 12/2018 | Chen | H04N 19/182 |
| 2018/0359483 A1* | 12/2018 | Chen | H04N 19/70 |
| 2019/0174136 A1 | 6/2019 | Jun et al. | |
| 2020/0014931 A1* | 1/2020 | Hsiao | H04N 19/517 |
| 2020/0045309 A1* | 2/2020 | Xu | H04N 19/105 |
| 2020/0177911 A1* | 6/2020 | Aono | H04N 19/563 |
| 2020/0195960 A1* | 6/2020 | Zhang | H04N 19/52 |
| 2020/0221097 A1* | 7/2020 | Laroche | H04N 19/105 |
| 2020/0280735 A1* | 9/2020 | Lim | H04N 19/176 |
| 2020/0382771 A1* | 12/2020 | Liu | H04N 19/159 |
| 2021/0337232 A1 | 10/2021 | Zheng et al. | |

FOREIGN PATENT DOCUMENTS

| | | |
|---|---|---|
| CN | 107534778 A | 1/2018 |
| JP | 2012191298 A | 10/2012 |
| WO | WO-2015139205 A1 | 9/2015 |
| WO | WO-2015143603 A1 | 10/2015 |
| WO | WO-2016165069 A1 | 10/2016 |
| WO | WO-2018049043 A1 | 3/2018 |
| WO | 2020084552 A1 | 4/2020 |

OTHER PUBLICATIONS

International Search Report and Written Opinion—PCT/CN2018/079458—ISA/EPO—dated Dec. 21, 2018.
International Preliminary Report on Patentability—PCT/CN2018/079458 The International Bureau of WIPO—Geneva, Switzerland, dated Oct. 1, 2020.
Lee (Qualcomm) S., et al., "EE2.6: Modification of Merge Candidate Derivation: ATMVP Simplification and Merge Pruning", JVET-C0035, 115. MPEG Meeting, May 30, 2016-Jun. 3, 2016, 3rd Meeting, May 26, 2016-Jun. 1, 2016, Geneva, CH, (Motion Picture Expert Group or ISO/IEC JTC1/SC29/WG11), No. m38395, May 16, 2016 (May 16, 2016), pp. 1-4, XP030269211, Retrieved from the Internet: URL: http://phenix.int-evry.fr/mpeg/doc_end_user/documents/115_Geneva/wg11/m38395-JVET-C0035-v1 -JVET-C0035_v1.zip JVET-C0035_v1.doc [retrieved-on May 16, 2016] section 2.
Supplementary European Search Report—EP18910438—Search Authority—The Hague—dated Oct. 8, 2021.
Chen J., et al., "Algorithm Description of Joint Exploration Test Model 6 (JEM 6)", JVET-F1001-v2, Joint Video Exploration Team (JVET) of ITU-T SG 16 WP 3 and ISO/IEC JTC 1/SC 29/WG 11, 6th Meeting, Hobart, AU, 3 Pages, Mar. 31-Apr. 7, 2017, p. 15 and 16.

* cited by examiner

Step 3

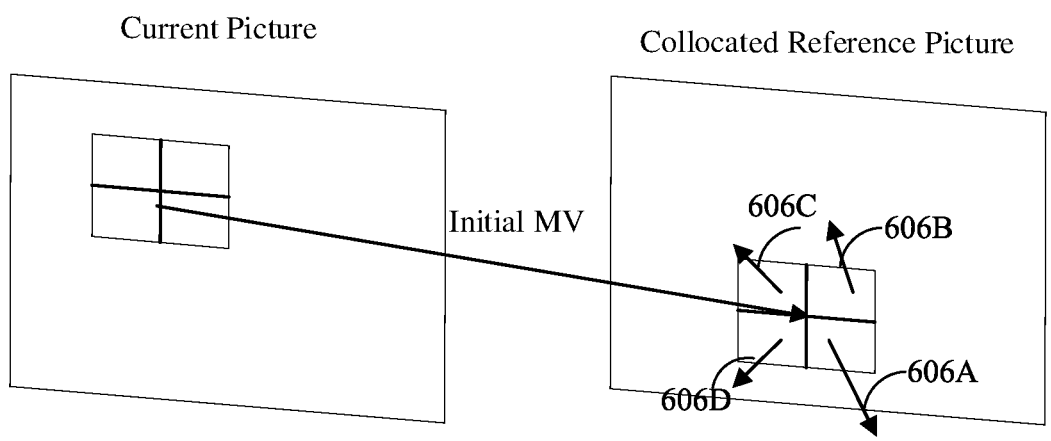
FIG. 5D (see improved step 3 in FIG. 4B)

ADVANCED TEMPORAL MOTION VECTOR PREDICTION

TECHNICAL FIELD

This disclosure relates to devices, systems, and methods for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded, i.e., the current block. The residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to improvements to advanced motion vector prediction. The techniques of this disclosure may be applied to future video coding standards.

In one example, the techniques are directed to a device for decoding a current block of video data in a current coding picture. The device may include a memory configured to store video data. The device may also include a processor a processor configured to determine which picture is a collocated picture, and determine a location of an associated block of the video data in the collocated picture that corresponds to the current block of video data in the current coding picture, based on using previously decoded blocks in the current coding picture to find an initial motion vector between the associated block in the collocated picture and the current block in the current coding picture, where the associated block of the video data includes at least one first derived motion vector. The processor may be configured to determine at least one second derived motion vector associated with the current block in the current coding picture, when the initial my points to the collocated picture, based on the at least on first derived motion vector associated with the associated block in the collocated picture. In addition, the processor may be configured to determine motion information of the current block of video data in the current coding picture based on the at least one second derived motion vector, use the determined motion information to obtain a prediction block, and generate a reconstructed block based on a combination of the prediction block and a residual block.

In another example, the techniques are directed to a method for decoding a current block of video data in a current coding picture. The method may include determining which picture is a collocated picture, and determining a location of an associated block of the video data in the collocated picture that corresponds to the current block of video data in the current coding picture, based on using previously decoded blocks in the current coding picture to find an initial motion vector between the associated block in the collocated picture and the current block in the current coding picture, where the associated block of the video data includes at least one first derived motion vector. The method may include determining at least one second derived motion vector associated with the current block in the current coding picture, when the initial my points to the collocated picture, based on the at least on first derived motion vector associated with the associated block in the collocated picture. The method may also include determining motion information of the current block of video data in the current coding picture based on the at least one second derived motion vector, using the determined motion information to obtain a prediction block; and generating a reconstructed block based on a combination of the prediction block and a residual block.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 5A-D are conceptual diagrams illustrating different examples to describe the relative locations of a collocated reference picture, reference picture and current coding picture.

DETAILED DESCRIPTION

Figure 1:
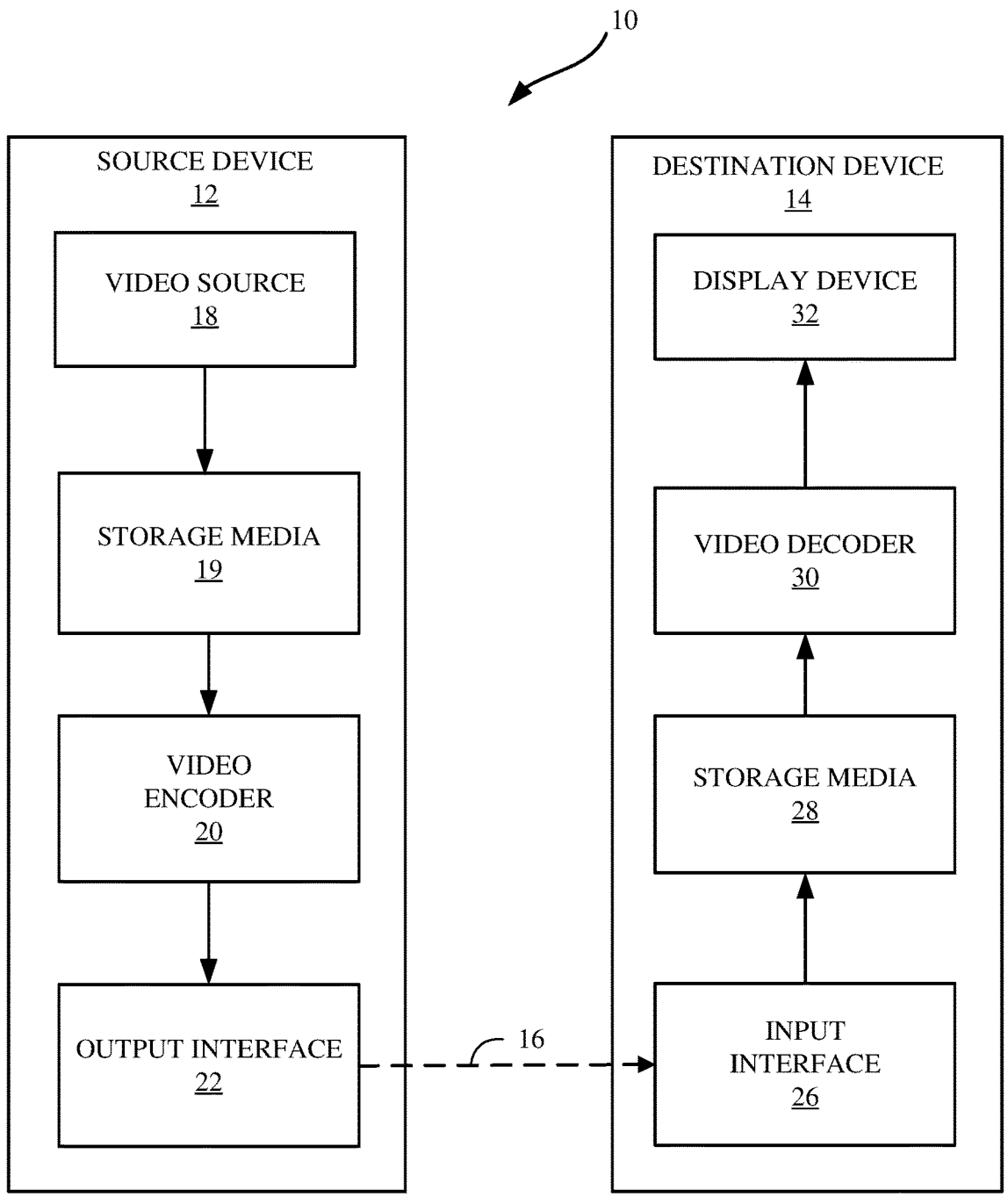
FIG. 1 is a block diagram illustrating an example video encoding and decoding system that may utilize one or more techniques described in this disclosure.

Motion compensation across multiple frames or pictures of video is often used in video encoding. A motion vector and a reference index associated with a prior frame or picture may be encoded. A motion vector predictor (MVP), and a motion vector difference (MVD), may be used to derive a motion vector.

An MVP may be selected from two candidates derived from a spatial and/or temporal neighborhood of a current block being encoded and/or decoded. ATMVP mode is an algorithm to select the MVP. In the existing ATMVP mode, the motion vector and reference index (i.e., motion information) may be derived from selecting different candidates, without having to encode a motion vector difference. Merge mode is the process of deriving a representation of motion vector candidates and predicting the coding of the motion vectors. As pictures are two-dimensional, use of a motion vector between pictures is also two dimensional. Thus, a motion vector has a horizontal component and a vertical component.

In existing systems, using advanced temporal motion vector prediction (ATMVP) algorithms, an inter prediction may use previously reconstructed pictures as a reference picture for motion compensation. Motion information from a co-located block or region in a reference picture is stored and then made available for use in the inter prediction. In some instances, the temporal motion vector's information in the reference picture is reduced to a 16×16 block, to limit the storage in the reference buffer (e.g., see Decoded Picture Buffer "DPB" 1216 in FIG. 7 and Decoded Picture Buffer "DPB" 1312 in FIG. 8). However, the motion information of each reference picture is stored in the reference buffer which increases the power consumption and size of memory.

A video coder (i.e., a video encoder or a video decoder) may implement, as descried in this disclosure, improvements to the ATMVP algorithms through alternative solutions that do not require the temporal motion vector's information to be stored from reference buffers as previously done.

In accordance with the techniques described herein, it is proposed that a device for decoding a current block of video data in a current coding picture, the device may include a memory configured to store video data. The device may also include a processor configured to determine which picture is a collocated picture. The collocated picture may be received, for example, having a representation signaled as with the HEW standard. The collocated picture may be determined using a reference index. For example, the reference index=0 may be used as a default as in doe in the ITU-T H.264 standard. In this disclosure, the reference index associated with a collocated picture, doesn't necessarily have to be zero, and may be a non-zero value. In addition, the processor may be further configured to determine a location of an associated block of the video data in the collocated picture that corresponds to the current block of video data in the current coding picture, based on using previously decoded blocks in the current coding picture to find an initial motion vector between the associated block in the collocated picture and the current block in the current coding picture, where the associated block of the video data includes at least one first derived motion vector (e.g., see the motion vectors in collocated picture in FIG. 5D). Thus, the location of the associated block in the collocated picture is determined.

Within this disclosure, a collocated picture which includes the at least one first derived motion vector based on a current coding picture including an initial motion vector that points to the collocated picture, so that the collocated picture may be used as a reference picture, without the need to rely on the reference pictures that include motion information in current techniques, may be referred to as a "collocated reference picture".

Moreover, the processor may be configured to determine at least one second derived motion vector associated with the current block in the current coding picture based on the at least on first derived motion vector associated with the associated block in the collocated picture. The at least one second derived motion vector may be used to determine motion information of the current block of video data in the current coding picture. The at least one second derived motion vector may aid in determining a prediction block. The prediction block in addition to the residual block may be used to reconstruct a current block.

As such, rather than performing the full process for deriving the motion vectors by storing each motion vector information of each reference picture (as done prior to the proposal in current techniques), by utilizing one or more motion vectors from the current coding picture and the at least one first derived motion vector of the collocated reference picture may be used to derive the at least one second motion vectors. Consequently, the video encoder and the video decoder may process the video data more efficiently, and the video encoder and/or the video decoder may provide more efficient means of compression and decompression that may consume less electricity and may provide a quicker coding result to a device that displays the decoded video data.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, a source device 12 provides the video data to a destination device 14 via a computer-readable medium 16. The source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, the source device 12 and destination device 14 may be equipped for wireless communication. Thus, the source device 12 and destination device 14 may be wireless communication devices. The source device 12 is an example video encoding device (i.e., a device for encoding video data). The destination device 14 is an example video decoding device (i.e., a device for decoding video data).

In the example of FIG. 1, the source device 12 includes a video source 18, storage media 19 configured to store video data, a video encoder 20, and an output interface 22. The destination device 14 includes an input interface 26, a storage media 28 configured to store encoded video data, a video decoder 30, and the display device 32. In other examples, the source device 12 and the destination device 14 include other components or arrangements. For example, the source device 12 may receive video data from an external video source, such as an external camera. Likewise, the destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." The source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, the system 10 may support one-way or two-way video transmission between source device 12 and destination device 14, e.g., for video streaming, video playback, video broadcasting, or video telephony.

The video source 18 of source device 12 may include a video capture device, such as a video camera, a video archive containing previously captured video, and/or a video feed interface to receive video data from a video content provider. As a further alternative, the video source 18 may generate computer graphics-based data as the source video, or a combination of live video, archived video, and computer-generated video. The source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. The output interface 22 may output the encoded video information to a computer-readable medium 16.

The output interface 22 may comprise various types of components or devices. For example, the output interface 22 may comprise a wireless transmitter, a modem, a wired networking component (e.g., an ethernet card), or another physical component. In examples where the output interface 22 comprises a wireless receiver, the output interface 22 may be configured to receive data, such as the bitstream, modulated according to a cellular communication standard, such as 4G, 4G-LTE, LTE Advanced, 5G, and the like. In some examples where the output interface 22 comprises a wireless receiver, the output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of the output interface 22 may be parts of a system on a chip (SoC). The SoC may also include other components, such as a general purpose microprocessor, a graphics processing unit, and so on.

The destination device 14 may receive the encoded video data to be decoded via computer-readable medium 16. The computer-readable medium 16 may comprise any type of medium or device capable of moving the encoded video data from source device 12 to destination device 14. In some examples, the computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. The destination device 14 may comprise one or more data storage media configured to store encoded video data and decoded video data.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. The destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. The destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, wired transmissions, satellite television transmissions, internee streaming video transmissions, such as dynamic adaptive streaming over HTTP (DASH), digital video that is encoded onto a data storage medium, decoding of digital video stored on a data storage medium, or other applications or combinations of the above examples. In some examples, system 10 may be configured to support one-way or two-way video transmission to support applications such as video streaming, video playback, video broadcasting, and/or video telephony.

The computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

The input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). The input interface 26 may comprise various types of components or devices. For example, the input interface 26 may comprise a wireless receiver, a modem, a wired networking component (e.g., an ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where the input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

The storage media 28 may be configured to store encoded video data, such as encoded video data (e.g., a bitstream) received by input interface 26. The display device 32 displays the decoded video data to a user, and may comprise any of a variety of display devices such as a cathode ray tube (CRT), a liquid crystal display (LCD), a plasma display, an organic light emitting diode (OLED) display, or another type of display device.

The video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In 2016, MPEG and ITU-T VCEG formed a joint exploration video team (JVET) to explore new coding tools for the next generation of video coding standard. The reference software is called JEM (joint exploration model).

In the current proposal to JEM, JEM, and other video coding specifications, video data includes a series of pictures. For example, in the series of pictures there may be a collocated picture, one or more reference picture, and a current coding picture. Pictures may also be referred to as "frames." A picture may include one or more sample arrays.

Each respective sample array of a picture may comprise an array of samples for a respective color component. In JEM, a picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only, include an array of luma samples.

As part of encoding video data, the video encoder 20 may encode pictures of the video data. In other words, the video encoder 20 may generate encoded representations of the pictures of the video data. An encoded representation of a picture may be referred to herein as a "coded picture" or an "encoded picture."

To generate an encoded representation of a picture, the video encoder 20 may encode blocks of the picture. The video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture.

The video encoder 20 may generate a predictive block (e.g., a luma, Cb, and Cr predictive block) for a prediction block (e.g., luma. Cb, and Cr prediction block) of a current block being encoded. The video encoder 20 may use intra prediction or inter prediction to generate a predictive block. If video encoder 20 uses intra prediction to generate a predictive block, the video encoder 20 may generate the predictive block based on decoded samples of the picture that includes the current block being encoded. In previous standards and JEM, the predictive block of the current block being encoded based on decoded samples of a reference picture (i.e., a picture other than the current picture). However, in the current proposal to JEM to improve the advanced temporal motion vector prediction algorithms in JEM, if the video encoder 20 uses inter prediction to generate a predictive block of the current block being encoded of a current picture, the video encoder 20 may generate the predictive block of the current block being encoded based on decoded samples of a collocated reference picture (i.e., a picture other than the current picture, and not necessarily the reference picture). It should be noted, that a collocated reference picture may be one of the reference pictures. In some embodiments, the collocated reference picture may have a reference index which is 0 in the List 0 or List 1 (further described below).

In some examples, the video encoder 20 skips application of the transforms to the transform block. In such examples, the video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After the video encoder 20 quantizes a coefficient block, the video encoder 20 may generate syntax elements indicating the quantized transform coefficients. The video encoder 20 may entropy encode one or more of the syntax elements indicating the quantized transform coefficients. For example, the video encoder 20 may perform Context-Adaptive Binary Arithmetic Coding (CABAC) on the syntax elements indicating the quantized transform coefficients. Thus, an encoded block (e.g., an encoded current block) may include the entropy encoded syntax elements indicating the quantized transform coefficients.

The video encoder 20 may output a bitstream that includes encoded video data. In other words, the video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

In JEM and in the current proposal to JEM, for each block, a set of motion information may be available. A set of motion information may include motion information for forward and backward prediction directions. Here, forward and backward prediction directions are two prediction directions of a bi-directional prediction mode and the terms "forward" and "backward" do not necessarily have a geometry meaning, instead they correspond to reference picture list 0 (RefPicList0) and reference picture list 1 (RefPicList1) of a current picture. When one reference picture list is available for a picture or slice, RefPicList0 is available and the motion information of each block of a slice is forward.

For each prediction direction, the motion information may contain a reference index and a motion vector. As was noted previously, a prediction block may be determined based on at least one second derived motion vector, that is associated with the current block in the current coding picture based on the at least on first derived motion vector associated with the associated block in the collocated picture. The prediction block may be associated with a forward prediction direction, or a backward prediction direction.

A reference index is used to identify a reference picture in the current reference picture list (RefPicList0 or RefPicList1). In prior techniques, the motion information could be derived from the use of a reference picture that was associated with a reference index. In the improvement to the ATMVP, because of the increase in buffer memory (e.g. DPB 1216 in FIG. 7 and DPB 1312 FIG. 8), it is desirable to derive motion information without using the reference picture for the first derived motion vectors. This may be possible, because the collocated reference picture may be one of the reference pictures. As such, all the reference pictures' motion information do not need to be stored.

The picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of IOC may be closer to each other in terms of decoding order. POC values of pictures are typically used for reference picture list construction. In the current proposal to JEM, derivation of reference picture may be set as in HEVC and motion vector scaling.

In the current proposal to JEM, and in JEM there are multiple inter prediction modes. Inter prediction includes Merge/Skip mode, FRUC mode, affine mode and AMVP mode. In either AMVP or merge mode, a motion vector (MV) candidate list is maintained for multiple motion vector predictors.

The motion vector(s), as well as reference indices in the merge mode, are generated by taking one candidate from the MV candidate list. The MV candidate list may contain up to 7 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined.

More specifically, in merge mode, the video encoder 20 and the video decoder 30 generate matching merge motion vector (MV) candidate lists for a current block. The merge MV candidate list for the current block may include one or more merge candidates, which may also be referred to as motion vector predictors (MVPs). In the current proposal to JEM and in JEM, the merge MV candidate list contains up to 7 merge candidates, Each respective merge candidate in the merge MV candidate list specifies one or more motion vector(s) and one or more reference index(es). For example, a merge candidate may specify a List 0 motion vector and/or a List 1 motion vector, and may specify a List 0 reference index and/or a List 1 reference index. A List 0 motion vector is a motion vector that indicates a location in a reference picture in List 0. A List 1 motion vector is a motion vector that indicates a location in a reference picture in List 1. The video encoder 20 may signal a merge index that indicates a location in the merge MV candidate list of a selected merge candidate for the current block. The video decoder 30 may use the merge index to identify the selected merge candidate.

In the current proposal to JEM, the fixed-order (explained further below with reference to spatial candidates), may be replaced by the candidates in the merge list, i.e., List 0 or List 1, to find the motion information with the current block. In one embodiment, the video decoder 30 may then use the (first derived) motion vectors from the collocated reference picture, to derive the second derived motion vectors using the reference indices of the selected merge candidate as the motion vectors (i.e., these may be the second derived motion vectors).

Figure 2A:
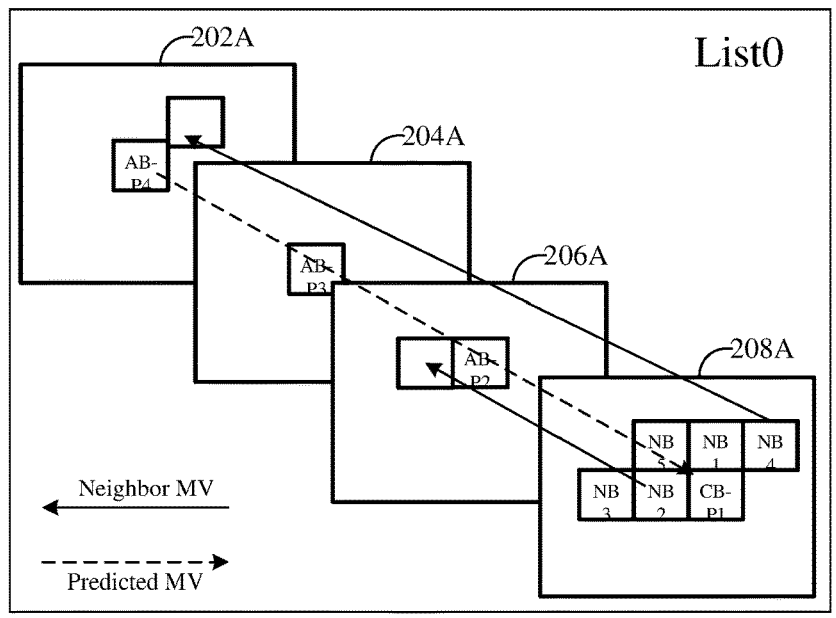
FIG. 2A-B are conceptual diagrams of an exemplary List 0, and List 1, respectively.
Figure 2B:
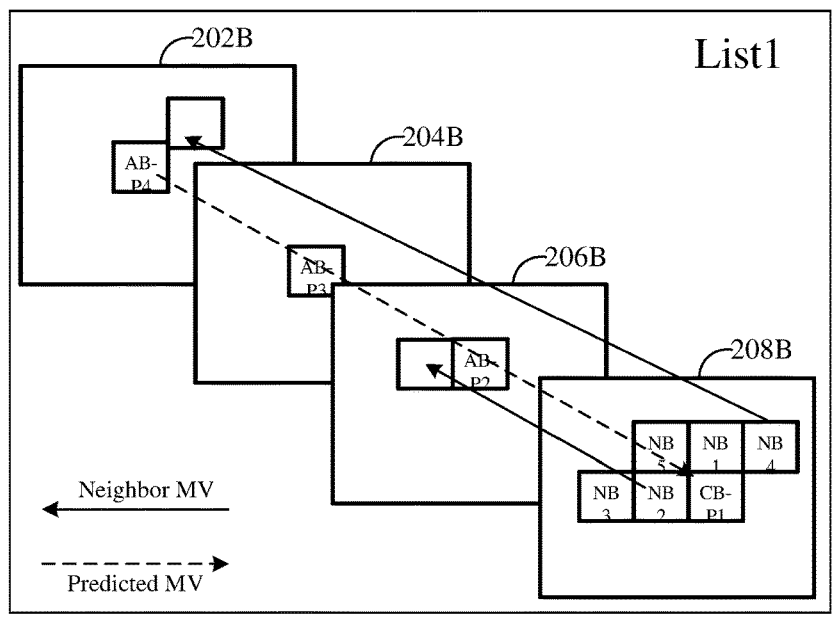

The illustrations in FIG. 2A and FIG. 2B, show conceptual diagrams of an exemplary List 0, and List 1, respectively. Exemplary list0 in FIG. 2A, illustrates four pictures {P4, P3, P2, and P1} with reference labels 202A, 204A, 206A, and 208A, respectively. Similarly, exemplary list1 in FIG. 2B, illustrates four pictures {P4, P3, P2, and P1}, with reference labels 202A, 204A, 206A, and 208A, respectively.

In JEM, in a first step in merge mode, up to four spatial MV candidates can be derived with the order shown in FIG. 2A with numbers, and the fixed order is the following: left (0), above (1), above-right (2), and below-left (3).

A current block (CB) in picture 1 208A, includes surrounding spatial neighbors {NB1, NB2, NB3, NB4, and NB5}. For example, NB1, NB2, NB3, and NB4 may be in a fixed order: left (0), above (1), above-right (2), and below-left (3). A spatial neighbor, e.g., NB4, may be a motion vector predictor (MVP) candidate as the surrounding spatial neighbors have already been decoded, and their motion information, if present, is already available, An already encoded or decoded block (represented as AB) may also have its own predicted motion vector (as illustrated by the arrow with the dashed lines).

Figure 2C:
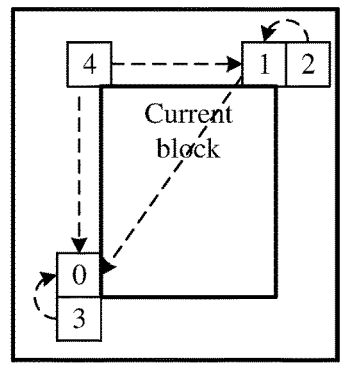
FIG. 2C illustrates a first step of spatial neighboring MV candidates for merge mode.

FIG. 2C illustrates a first step of spatial neighboring MV candidates for merge mode. Subsequent steps may check for an ATMVP candidate, check for an STMVP candidate. If the candidates number less than 6, a check above-left (4) may be next. Then a check of a temporal candidate may be performed. In order to get the temporal candidate, check of the bottom-right position at first, if that's not available a check of the center block may be performed. If the merge candidate list size is less than 7, additional candidates may be added until the list size equals 7.

In this disclosure, motion information of a previously coded lock may be used to generate an initial motion vector. The previously coded block may be a neighboring block of the current block being encoded or decoded. The motion information may include a reference index, a motion vector and an inter-direction.

The initial motion vector may be used to point back to a corresponding block in a collocated reference picture that has already been encoded or decoded.

Figure 4A:
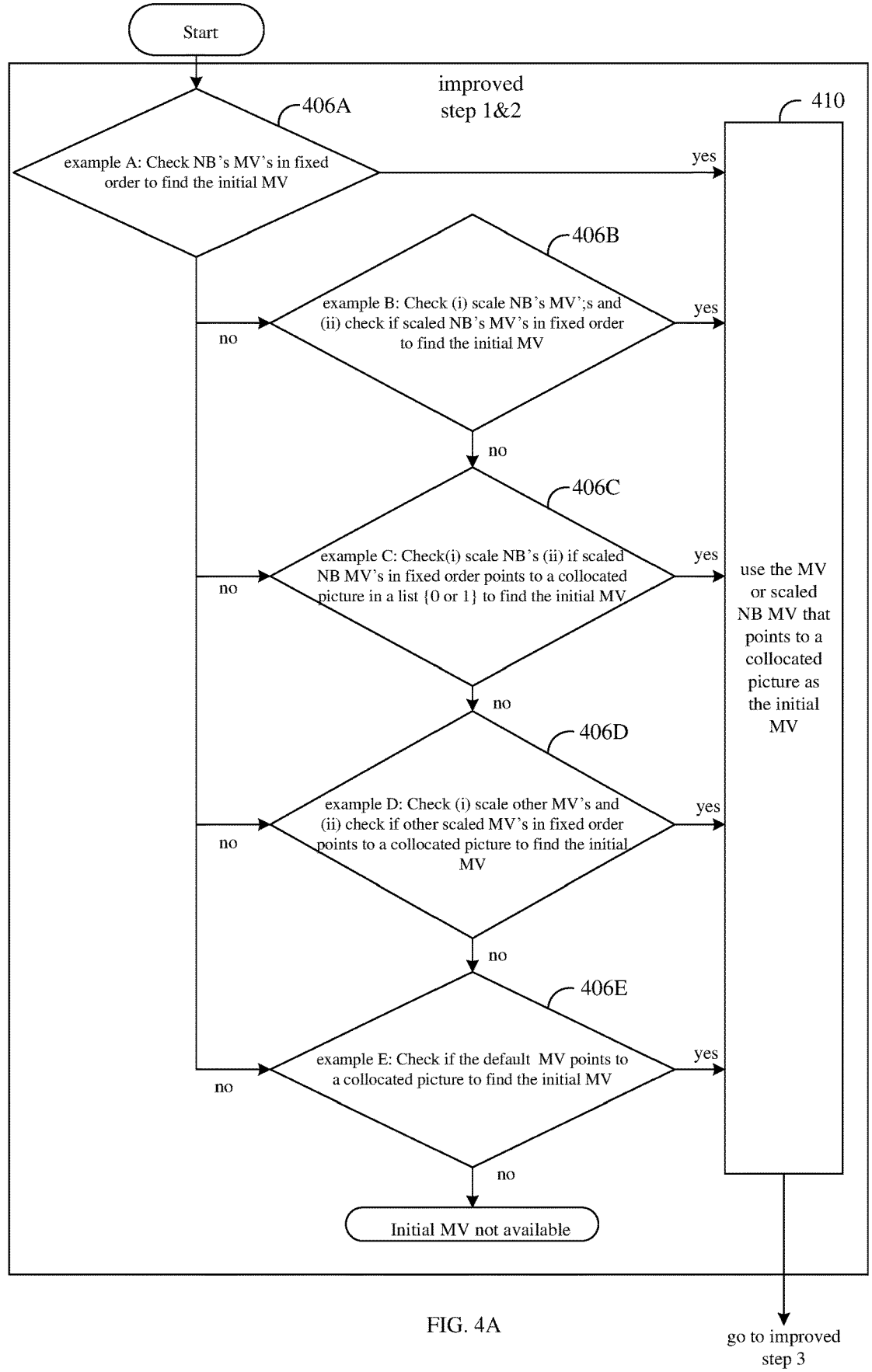
FIG. 4A-B illustrate proposed improvements for ATMVP to current JEM.
Figure 4B:
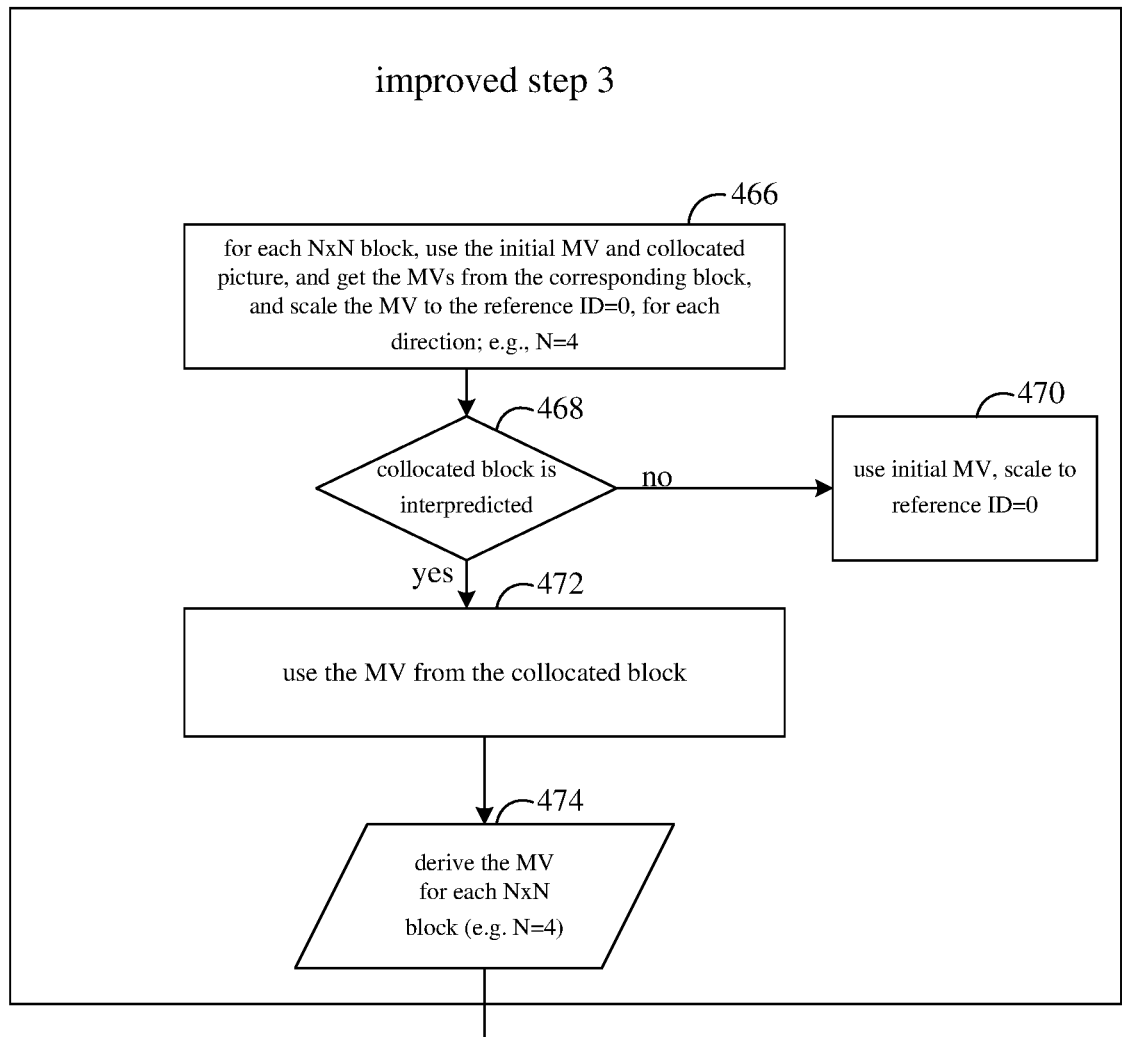

In accordance with the techniques described herein, the video encoder 20 may utilize use the motion information of previously coded blocks to generate an initial motion vector [e.g., see flowchart in FIG. 4A-4B] which may be used to point to the corresponding block in a collocated reference picture to encode video data. The corresponding block in the collocated reference picture may include a first set of derived motion vectors, which may be used to find a second set of derived motion vectors.

For instance, the video encoder 20 may determine, for a current block in a current picture of the video data, a coding block in a previously-coded picture. The coding block may cover a co-located block in the previously-coded picture and a position within the previously-coded picture. However, the previously coded picture is not necessarily a reference block. The co-located block may have a same shape as the current block, and a location of the co-located block within the previously-coded picture may be the same as a location of the current block within the current picture. Based on one or more motion vectors for the coding block, the video encoder 20 may determine one or more motion vectors for the current block. Based on the one or more motion vectors for the current block, video encoder 20 may use the motion information of previously coded blocks to generate an initial motion vector, which may be used to point to the corresponding block in a collocated reference picture. The video encoder 20 may then generate residual data using the predictive block and the current block.

Similarly, the video decoder 30 may use the motion information of coded neighboring blocks to generate an initial motion vector, which may be used to point to the corresponding block in a collocated reference picture. For instance, the video decoder 30 may determine, for a current block in a current picture of the video data, a coding block in a previously-coded picture. The coding block may cover a co-located block in the previously-coded picture and a position within the previously-coded picture. The co-located block may have a same shape as the current block, and a location of the co-located block within the previously-coded picture may be the same as a location of the current block within the current picture. Based on one or more motion vectors for the coding block, video decoder 30 may determine one or more motion vectors for the current block.

Based on the one or more motion vectors for the current block, video decoder 30 may use the motion information of previously coded blocks to generate an initial motion vector, which may be used to point to the corresponding block in a col located reference picture. Video decoder 30 may then use residual data and the predictive block to reconstruct the current block.

A merge candidate corresponds to a full set of motion information while an AMVP candidate contains just one motion vector for a specific prediction direction. The candidates for both merge mode and AMVP mode may be derived similarly from the same spatial and temporal neighboring blocks.

Within a video coder (i.e., a video encoder or video decoder) a motion vector may be scaled. When scaling a motion vector, the value of a motion vector may be proportional to the distance of pictures in the presentation time. A motion vector associates two pictures, the collocated reference picture, and the picture containing the motion vector. Within this disclosure, the motion vector is an initial motion vector, and the collocated reference picture includes first derived motion vectors (at least one first derived motion vector) and the picture containing the motion vector is the current coding picture. When the initial motion vector is used to predict the other motion vector, i.e., the first derived motion vector in the collocated reference picture, the distance of the containing picture and the reference picture is calculated based on Picture Order Count (POC) values of the collocated reference picture and the containing picture (i.e., the current coding picture).

For a motion vector to be predicted, both its associated containing picture and collocated reference picture may be different. Therefore, a new distance (based on POC) is calculated. The initial motion vector is scaled based on these two POC distances. For a spatial neighboring candidate, the containing pictures for the two motion vectors are the same, while the collocated reference pictures are different. In the proposal to JEM and in JEM, motion vector scaling applies to both TMVP and AMVP for spatial and temporal neighboring candidates.

In the existing JEM, advanced temporal motion vector prediction (ATMVP), motion information (including motion vectors and reference frames) in ATMVP comes through only from the reference pictures. To derive ATMVP of the current block the first step is to determine where the temporal motion vectors are to be fetched (from the DPB buffer 1216 in FIG. 7 or DPB 1312 in FIG. 8). The ATMVP may find the first available motion vector in five neighboring blocks in the fixed order: {Left, Above, Above-right, Left-bottom, and Above-left}. The definition of the five neighboring blocks is the same as spatial merge candidates of the current block. To avoid the repetitive scanning process of previously coded neighboring blocks, finding the motion vector of the first merge candidate in the already-derived merge candidate list to determine where to fetch the temporal motion vector is desirable. The current block may be split into square N×N sub-block (e.g., N is set to 4). The motion vectors of the sub-blocks may then be derived recursively, following raster scan order. As an example, the flowchart in current JEM reference software is illustrated in FIG. 3A-3C.

Figure 3A:
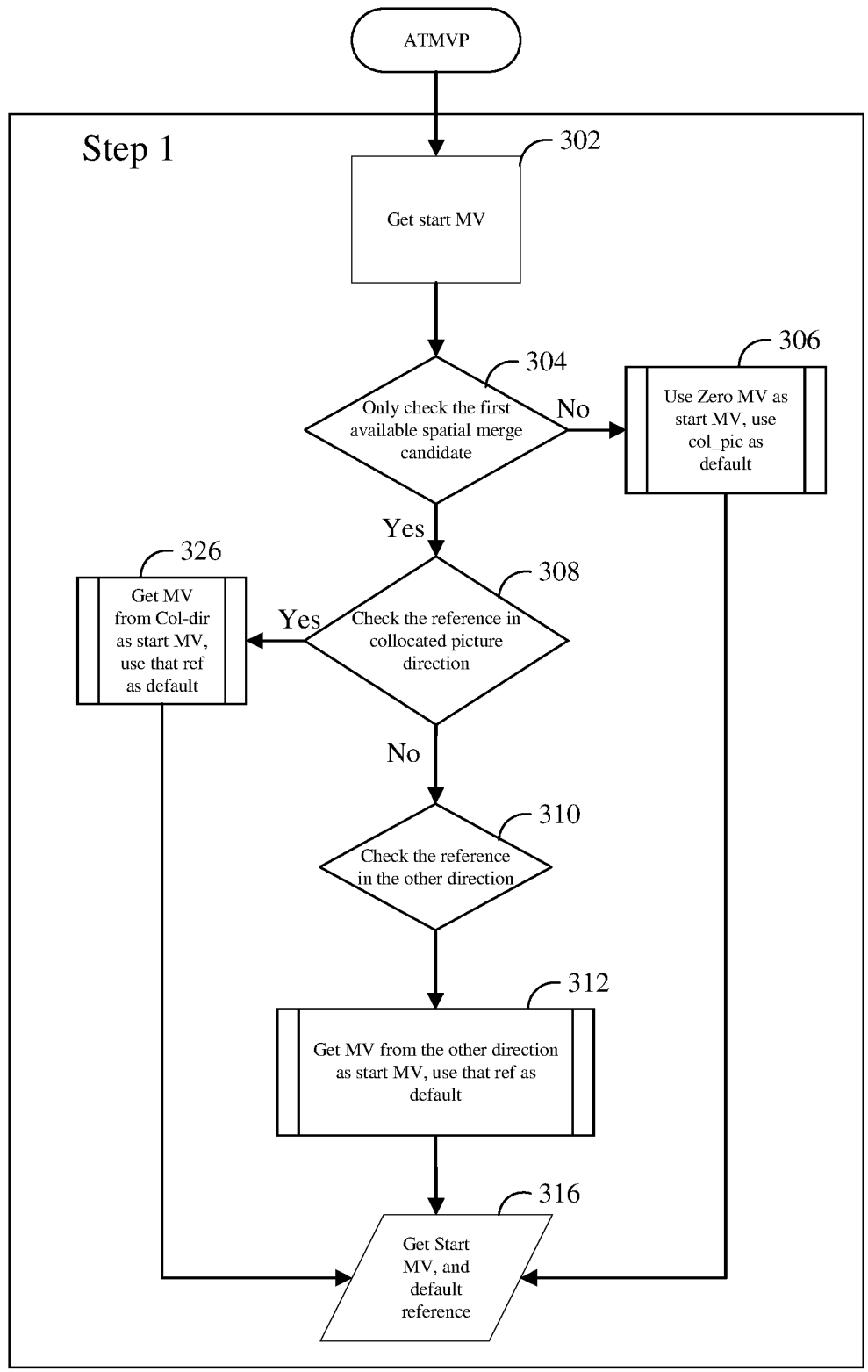
FIG. 3A-C illustrate flowcharts in current JEM reference software.
Figure 3B:
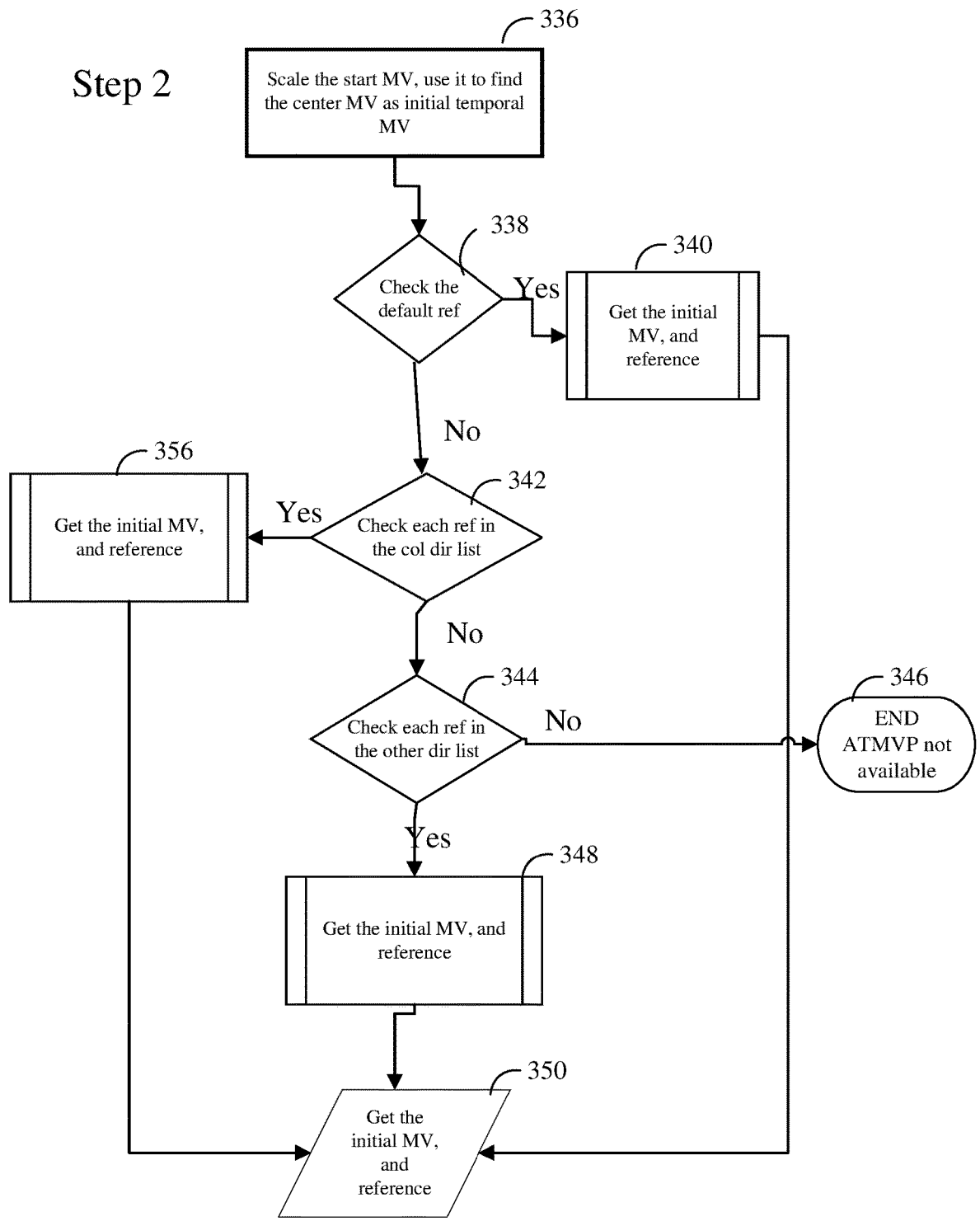
Figure 3C:
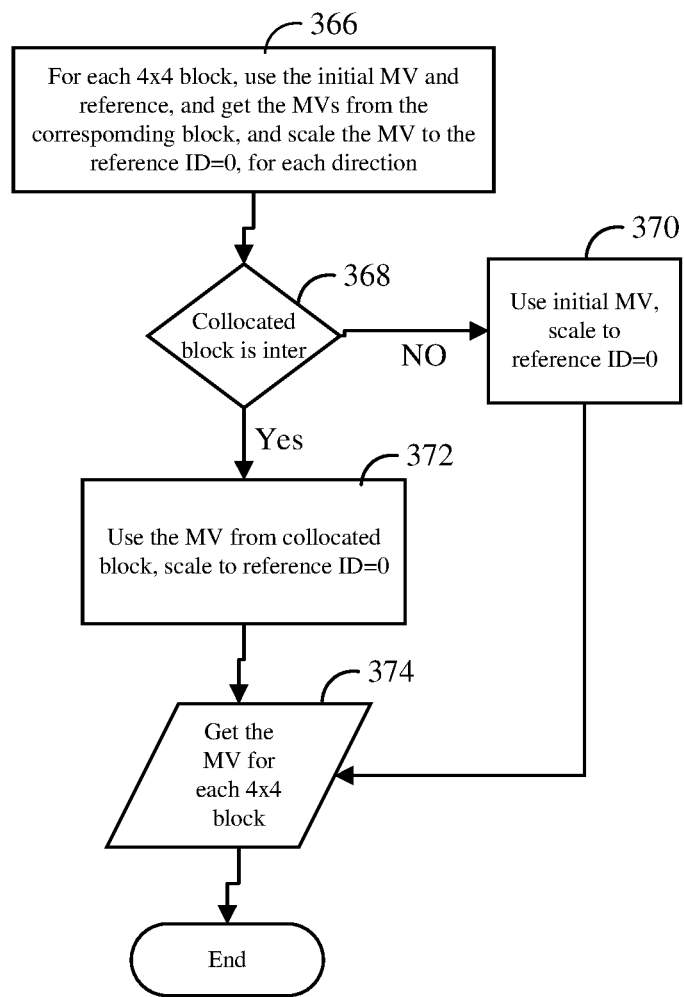

Note, that in Step 1 of FIG. 3A, in Step 1, a start motion vector is obtained from only the reference picture. In step 2 of FIG. 3B, the initial motion vector is obtained from only the reference picture. These limitations creates the aforementioned problem that in ATMVP algorithms, motion vector's information are fetched from reference pictures which are stored in reference buffer (e.g., DPB buffer 1216 in FIG. 7, or DPB 1312 in FIG. 8), The motion vector information of each reference storage in the reference buffer increases the power consumption and size of memory.

Figure 6:
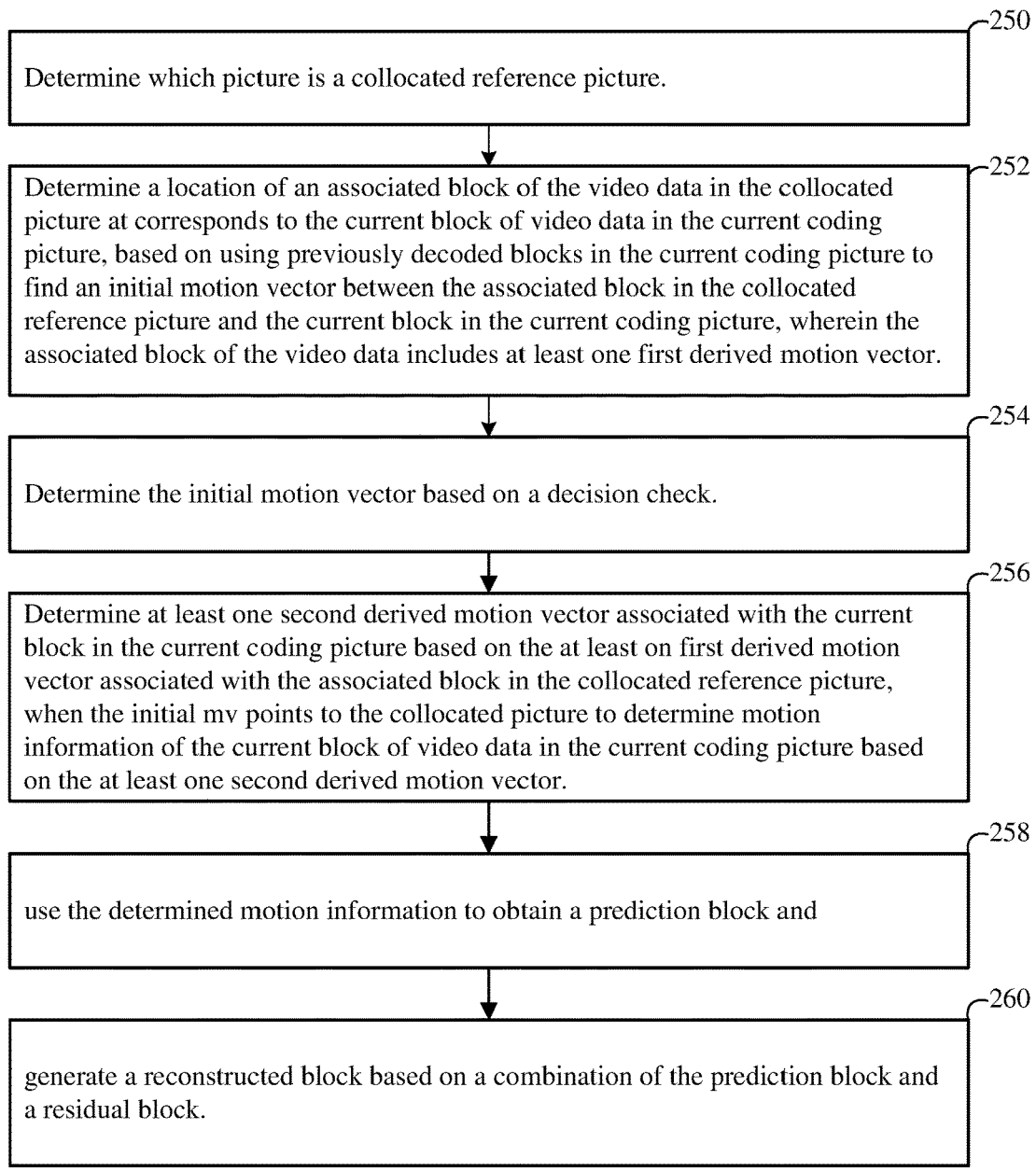
FIG. 6 is a flowchart that describe one or more techniques in this disclosure.

The proposed improvement for ATMVP to current JEM and future standards are illustrated in FIG. 4A, 4B, as well as, FIG. 6. flowcharts. The proposed improvement is that the initial motion vector may point to the collocated picture, and not the reference picture to determine motion vectors.

It is contemplated that the motion vectors (MV) of the current block in the current picture may be derived from the motion vectors (i.e., a first set of motion vectors) associated with a corresponding block in the collocated reference picture and the current coding picture only. Thus, the motion vectors of the current block in the current picture that may be derived may be considered a second set of derived motion vectors. This overcomes the reliance on having motion vectors be derived only on the reference pictures, which increase the reference buffer as discussed previously.

In one example, the encoder or decoder may be in ATMVP mode, and only of the current coding picture and of the collocated picture may be used to derive the motion vectors in ATMVP mode, Within the ATMVP mode, there may be a merge mode where only MVs of the current coding picture and of the collocated picture may be used to derive the motion vectors in merge mode. Whereas previously, motion information was used by finding the motion vectors of neighboring blocks of a current block within reference pictures, it is contemplated that finding a collocated reference picture improves memory efficiency.

In one example as illustrated in example A of FIG. 4A, there is a decision check 406A, where a set of pictures (e.g., P4, P3, P2 as in FIG. 2A, and/or FIG. 2B), may have at least one previous lock that was previously coded. The current picture (e.g., P1 in FIG. 2A, and/or FIG. 2B) may have a current block (CB-P1) to be coded, has a spatial candidate of neighboring blocks (NB1-NB5) which were also previously coded. That is to say, the decision check to find the initial motion vector is based on a check if the motion vector's of the previous decoded blocks in the current coding picture.

The motion vectors of the previously coded blocks, including neighboring blocks, within the current picture may be used to find the corresponding block associated with the current block. The motion vectors of the previously coded blocks, including neighboring blocks, within the current picture may be checked in a fixed order to find an initial motion vector that points to a collocated reference picture. For example, the fixed order may be to check neighboring blocks {NB1-NB5}.

If the corresponding block in was coded with interprediction, i.e., temporally between the current picture (P1) and a previous picture (e.g., P2-P4), and a match is found, then one of the previous pictures is a collocated picture, and the example A: 406A decision check is stopped (yes). Thus, one of the neighboring blocks around the current block in the current picture has a motion vector that points to a corresponding block, and may be denoted as the initial motion vector 410.

In example A, 406A, it is desirable to prioritize searching for an initial motion vector by first checking there are available motion vectors of the neighboring blocks of the current block in a reference picture. If there is a match, the reference picture is also a collocated reference picture, and the improved step 1 and step 2 lead to improved step 3. Thus, the decision check to find the initial motion vector is based on a fixed order, where the fixed order is to check the previous decoded blocks prior to the current block of the current picture of the video data. Alternatively, it may be possible that the decision check is not the highest priority to find an initial motion vector that points to the collocated reference picture.

In FIG. 4B, the improved step 3 is illustrated. For each N×N block (e.g., N=4) in a current block, the initial motion vector may point to the collocated picture (see FIG. 5D), and the motion vectors in the collocated picture from the corresponding block pointed to by the current block may be derived. The motion vectors in the collocated picture may be scaled to the reference ID=0, for each direction. If the reference location used by the current block is different from the reference used by the block from which the MV is derived, scaling is used. As such, the decision check to find the initial motion vector is based on a scaling operation to the motion vector of the previous decoded blocks' MV's. In addition, the decision check to find the initial motion vector includes a scale of other motion vectors that are not neighbor blocks of the current block in the current coding picture, and a check if the scaled other motion vectors point to a collocated reference picture.

In an example, we force the ATMVP mode to use the reference of which ID equal to 0, so we have to scale the MV to the reference whose ID is 0. In one embodiment, the search for the initial motion vector in example A, 406A, may be implemented as the highest priority, i.e., performed prior to the other examples B-E (406B-406E). Thus, the decision check is implemented as the highest priority to find the initial motion vector that points to the collocated reference picture.

In another example, example B 406B, if there isn't a match (no) in a previous check, (e.g., 406A), then the collocated reference picture was not a reference picture, and the collocated reference picture may be in different positions in time relative to the current picture and a reference picture.

Figure 5A:
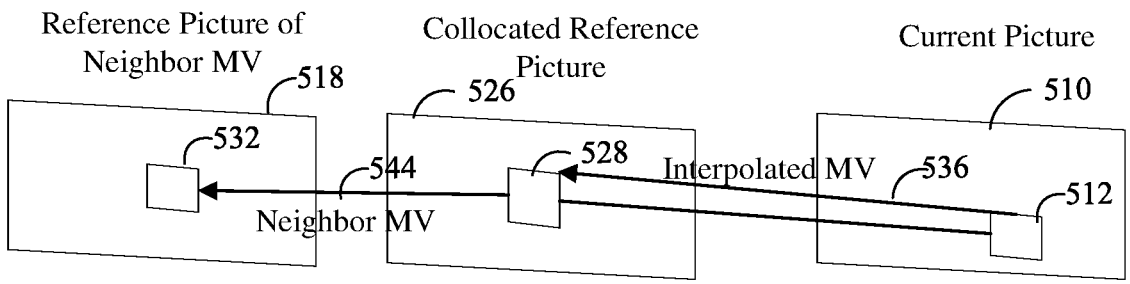
Figure 5B:
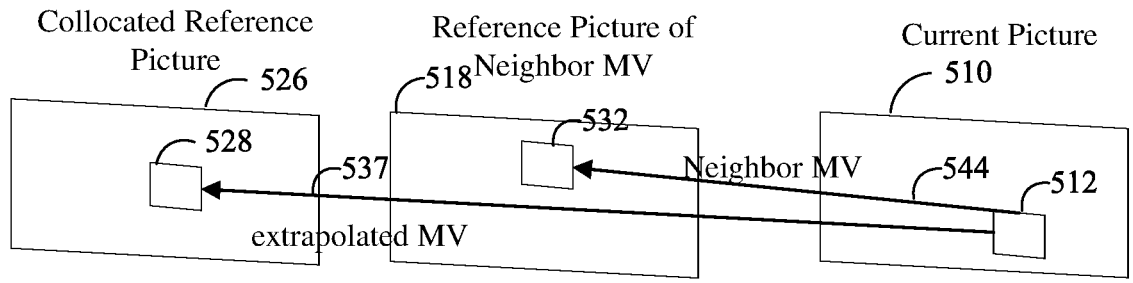
Figure 5C:
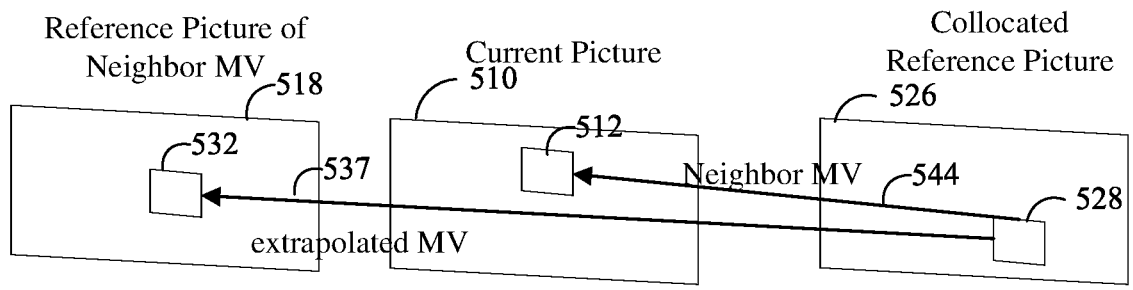

Three different examples are illustrated in conceptual figures FIG. 5A-5C. In the examples in FIG. 5A-5C, if an initial motion vector is not found that results in the current block 512 of a current picture 510 matching an associated block in a different picture associated with the current block 512, then the motion vector (e.g. 528) of a neighborhood spatial candidate of a reference picture 518 may be scaled to a collocated reference picture 526. In one embodiment, in instances where the motion vector 528 may be scaled to a collocated reference picture 526, the illustrations in example 406B, may be implemented as the second highest priority, i.e., performed prior to other examples 406C-406E.

The distance of the current picture and the collocated reference picture is calculated based on Picture Order Count (POC) values of the current picture and the collocated reference picture. The scaled motion vector may be based on a linear operation, e.g., based on a division, multiplication, subtraction, and/or an addition. The scaled motion vector may be referred to as an interpolated motion vector. In some cases, the scaled motion vector may also be referred to as an extrapolated motion vector. Thus, the scaling operation may include interpolation, or an extrapolation, of the motion vector's of the previous decoded blocks' in the current coding picture.

For example, in FIG. 5A, motion vectors (e.g. neighboring motion vector (MV) 544) of neighboring spatial candidates of the current block 512 in the current picture 510 may be scaled to the collocated reference picture 526. The scaling may be referred to as an interpolation, and the generated scaled vector may be referred to as an interpolation motion vector 536 which is based on the POC value of the collocated reference picture 526, and the reference picture 518. If the location of an associated block 528 of the video data in the collocated picture 526 corresponds to the current block 512 of video data in the current coding picture 510, based on using previously decoded blocks (e.g., a neighboring spatial candidate) in the current coding picture 510 then the interpolation motion vector 536 may be the initial motion vector. In FIG. 5A, the interpolation motion vector 536 represents a shorter temporal distance than the neighbor motion vector 544, because the collocated reference picture 526 is closer to the current picture 510 than the reference picture 518.

In other embodiments, illustrated in FIG. 5B and FIG. 5C, the collocated reference picture 526 is not located in between a reference picture 518 and a current picture 510, the motion vector (e.g., neighboring MV 544) may be scaled to the collocated reference picture 526. The scaling may be referred to as an extrapolation, and the generated scaled vector may be referred to as an extrapolation vector (e.g. extrapolated motion vector 537) which is based on the POC value of the collocated reference picture 526 and the reference picture 518. If the location of an associated block 528 of the video data in the collocated picture 526 corresponds to the current block 512 of video data in the current coding picture 510, based on using previously decoded blocks (e.g., a neighboring spatial candidate) in the current coding picture 510 then the extrapolated motion vector 537 may be the initial motion vector. The examples illustrated in FIGS. 5B and 5C may be implemented with the same priority as the example in FIG. 5A, or, in an alternative embodiment, may be implemented with a lower priority than that of example in FIG. 5A.

In FIG. 5B, the extrapolation motion vector 537 represents a longer temporal distance than the neighbor motion vector 544, because the collocated reference picture 526 is further away from the current picture 510 than the reference picture 518.

In FIG. 5C, the extrapolation motion vector 537 represents a temporal distance that is in the opposite direction than the temporal distance of the neighbor motion vector 544 to the reference picture 518. As discussed above, the collocated reference picture 526 does not necessarily require saving a reference index in a decoder picture buffer. As such, use of collocated reference picture is more desirable than using a reference picture 528 to find an initial motion vector.

When the scaled motion vector (e.g. interpolation motion vector 536, or extrapolation motion vector 537) points to a collocated reference picture 526 the improved step 1 and step 2 leads to improved step 3. The scaled motion vector then becomes the initial motion vector (as illustrated in FIG. 5D).

In example C: 406C, a decision check (i) may be performed to scale the motion vectors of the neighboring blocks; (ii) if the scaled neighboring motion vectors' and may be checked in a fixed order (e.g., NB1-NB5), to find if the point to a collocated picture in a list {list 0 or list 1} to find the initial motion vector.

If there is a match, the scaled motion vector points to a collocated reference picture in a list, and the improved step 1 and step 2 leads to improved step 3. The scaled motion vector then becomes the initial motion vector (as illustrated in FIG. 5D), where the collocated picture is located in a list {list 0 or list 1}.

If there is a match, the scaled motion vector points to a collocated reference picture in a list, and the improved step 1 and step 2 leads to improved step 3. The scaled motion vector then becomes the initial motion vector (as illustrated in FIG. 5D).

In example C, 406C, if a previous decision check as described with respect to examples 406A, and 406B, did not result in a match between a current block in the current picture 510 and another block with an associated motion vector (e.g., in a reference picture (example 406A), where the associated motion vector is scaled in a collocated reference picture (example 406B), then a further decision check 406D may be performed with a lower priority than any of the previous examples. Thus, the decision check of may not necessarily be the highest priority to find an initial motion vector that points to the collocated reference picture.

In example D: decision check 406D may (i) first scale other HIV's (that are not neighbor blocks of the current block in the current picture) and (ii) check if the other scaled MV's point to a collocated picture to find the initial MV. If one of the scaled other motion vectors point to a collocated picture, then the scaled other motion vector may be the initial motion vector (as illustrated in FIG. 5D).

If there is a match, the scaled other motion vector points to a collocated reference picture, and the improved step 1 and step 2 leads to improved step 3. The scaled motion vector then becomes the initial motion vector (as illustrated in FIG. 3D). In example E: decision check 406E if all the neighbor block's motion vectors failed, then the default motion vector (i.e., motion vector (0,0)) may be checked to point to a collocated picture to find the initial MV. If there is a match, the default motion vector points to a collocated reference picture, and the improved step 1 and step 2 leads to improved step 3. The default motion vector then becomes the initial motion vector (as illustrated in FIG. 5D).

In addition to the examples A-E, applicable in ATMVP mode, every block can be a neighbor block, but a neighbor block may not necessarily be merge candidate, i.e., the neighboring block of the current picture may not necessarily be a merge candidate. Thus, a previously coded block that is a neighboring block may be used to find an initial motion vector. Similarly, a previously coded block that is a neighboring block of the current picture and is also a merge candidate may be used to find an initial motion vector.

Thus, it may also be possible to use the merge candidates in the merger candidate list to generate the initial motion vector. In one example, if more than one spatial candidate is available, the checking order may depend on the reference pictures used by the spatial candidates to generate the initial motion vector. In another example, if more than one merge candidate is available, a checking order may depend on the order of candidates in a merge candidate list. In yet another example, if more than one merge candidate is available, a temporal candidate in a previously decoded picture is checked before a spatial candidate in the current coding picture. For coding efficiency, in another example, if more than one merge candidate is available, a spatial candidate in the current coding picture is checked before a temporal in a previously decoded picture.

In the examples above where the initial motion vector may be generated by a function of the neighboring blocks' motion vector's, there may different variants used besides expressly using the neighboring blocks' motion vector's. For example, the median value of the neighboring blocks' motion vector's may be used as the initial motion vector. In another variant, the average value of the neighboring blocks' motion vectors may be the initial motion vector.

With the techniques in this disclosure, in merge mode which is a mode within ATMVP mode, a motion vector may be added to a list and may be used to predict the other motion vector (e.g., the initial motion vector). If the POCs of references used by the merge candidates are different, then the motion vectors may be scaled to the collocated reference picture 526.

For example, 406AMV (analogous to example 406A), the motion vector of a spatial merge candidate pointing to the collocated reference picture may be implemented as the initial motion vector with the highest priority. For convenience, "MV" is appended to the reference labels in examples 406A-406E, to expressly describe the applicability of the examples 406A-406E when the ATMVP mode is in merge mode.

If an initial motion vector in example 406AMV cannot be found, then (analogous to example 406B) another example, 406BMV, may comprise the motion vector of a spatial merge candidate which can be scaled (e.g., interpolated or extrapolated) to the collocated reference picture 526. The scaled motion vector (whether interpolated or extrapolated) may be implemented as the initial motion vector and the check may have a lower priority than that of example 406AMV.

If the checks in the examples 406AMV or 406BMV do not result in an initial vector being found, then in another example, 406CMV (analogous to example 406C), the motion vector of a spatial merge candidate may be scaled to the collocated reference picture with extrapolation is treated as the initial motion vector as illustrated in FIG. 5D. The example 406CMV may be implemented as a lower priority check than that of either examples 406AMV and 406BMV.

It is possible that a match is not found with the various implementations in example 406AMV, 406BMV, or 406CMV. In such a case, (analogous to example 406D) example 406DMV, decision check 406D may (i) first scale other MV's (that are not neighbor blocks of the current block in the current picture) and (ii) check if the other scaled MV's point to a collocated picture to find the initial MV. If one of the scaled other motion vectors point to a collocated picture, then the scaled other motion vector may be the initial motion vector (as illustrated in FIG. 5D). The example 406DMV may be implemented as a lower priority check than that of either examples 406AMV, 406BMV, or 406CMV.

It is possible that a match is not found with the various implementations in example 406AMV, 406BMV, 406CMV, or 406DMV. In such a case, (analogous to example 406E) example 406EMV, decision check 406E if all the neighbor block's motion vectors failed, then the default motion vector (i.e., motion vector (0,0) may be checked to point to a collocated picture to find the initial MV.

If there is a match, the default motion vector points to a collocated reference picture, and the improved step 1 and step 2 leads to improved step 3. The default motion vector then becomes the initial motion vector (as illustrated in FIG. 5D). Thus, the decision check to find the initial motion vector may include using a default motion vector to point to the collocated reference picture.

It should be noted that there are variants to the examples 406AMV, 406BMV, 406CMV, 406DMV, and 406EMV. In one variant, if more than one merge candidates are available, the checking order may depend on the order of candidates in the merge candidate list. In another variant; if more than one merge candidates are available, the checking order may depend on types of the candidates. The temporal candidates may be checked first; then the spatial candidates may be checked; or, alternatively, the spatial candidates may be checked first, then the temporal candidates may be checked. In another variant, the median value of the merge candidates' MVs may be used as the initial motion vector, i.e., the initial motion vector may be an average value of motion vectors of at least two previous coded blocks. In general, the initial motion vector may be based on a comparison of at least two motion vectors. In another variant, the initial motion vector may be a median value of motion vectors of at least three previous coded blocks. In another variant, the average value of the merge candidates' MVs may be used as the initial MV. In some of the previous examples or variants, if the POCs of references used by the merge candidates are different, the MVs may be scaled to the collocated reference picture.

As illustrated in FIG. 5D, the initial motion vector may point to a position of a block (or sub-block) in the collocated reference picture 526. Motion vectors 606A-606D in the collocated reference picture 526 may be derived for the sub blocks associated with the position of the current block in the current picture 526. Although there are four motion vectors 606A-606D shown, and these four motion vectors 606A-606D are the first derived motion vectors, there may only be one first derived motion vector 606x, where X=A, B, C, or D. As such, the associated block in the collocated reference picture 526 includes sub-blocks with the first derived motion vectors. The initial motion vector may be determined based on a decision check. In some embodiments, the initial motion vector may be determined by example 406A, 406B, 406C, 406D, or example 406E. In an alternative embodiment, the initial motion vector may be determined by example 406AMV, 406BMV, 406CMV, 406DMV, or example 406EMV.

The first derived motion vectors may be scaled or used. For example, one or more of the first derived motion vectors 606A-606D may point to another block in another picture. The another block may include another motion vector (i.e., a second derived motion vector). The temporal distance between the collocated reference picture and, the another picture may not be adjacent to each other. The distance of the collocated reference picture and, the another picture may be calculated based on Picture Order Count (POC) values of the collocated reference picture and the another picture. As such, the first derived motion vectors may be scaled. In instances, where the collocated reference picture and, the another picture are adjacent to each other, the first derived motion vector may be used (e.g., copied or referenced) to generate a second derived motion vector. In the case where at least one first derived motion vector (606A, 606B, 606C, or 606D) is scaled, the scaled first derived motion vectors may be applied to the current block of the current picture to generate at least one second derived motion vector in the another picture. The another picture may be the current coding picture. Moreover, the at least one second derived motion vector (not drawn) may point to another picture (e.g., may be the current coding picture) based on inter-direction. An inter-direction may include a motion vector from a block to another block in List 0 or List 1 (as discussed above). Thus, the at least one second derived motion vector may point to another block in List 0 or List 1, and within List 0 or List 1, the current coding picture may be included in one of these two lists. The another block may be the current block in the current coding picture.

In addition, the collocated reference picture may be the reference picture with a reference index, and the reference index may have a number of values, e.g., 0, 1, 2, 3, etc. For convenience, the reference index may be the default value of 0. It should be noted that the at least one first derived motion vector of the associated block in the collocated reference picture may be scaled according to the POC of the current block in the current picture relative to the collocated reference picture.

The collocated reference picture 526 may be the same as defined in HEW or a different picture may be signaled from the encoder to the decoder at sequence level, picture level, slice level, or block level. For example, the collocated reference picture may be signaled in Sequence Parameter Set (SPS), Picture Parameter Set (PPS), Slice header (SII), Coding Tree Unit (CTU) or Coding Unit (CU).

Figure 8:
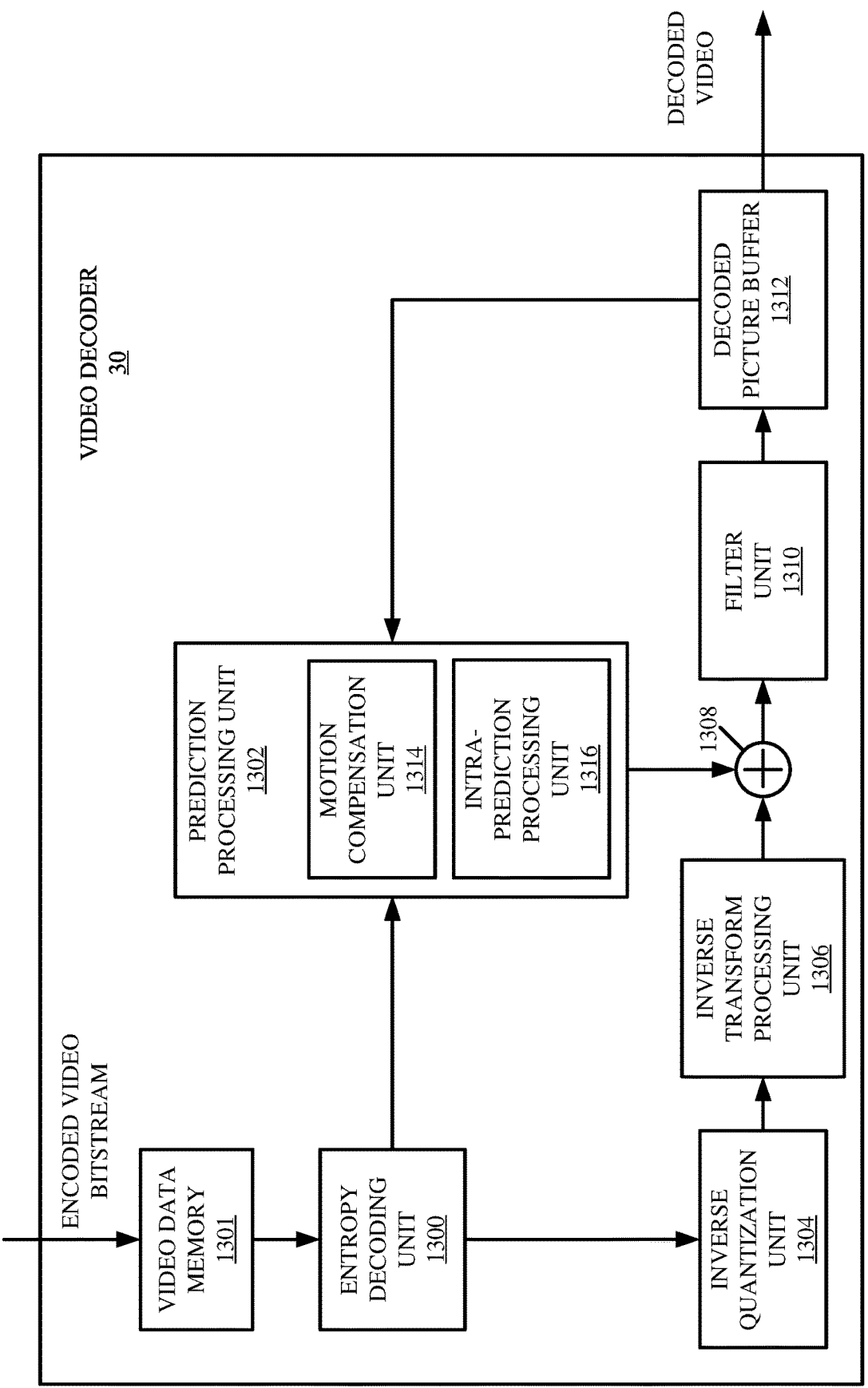
FIG. 8 is a block diagram illustrating an example video decoder that may implement one or more techniques described in this disclosure.

FIG. 6 is a flowchart illustrating example operation of the video decoder 30 of FIG. 1 and FIG. 8 in performing various aspects of the techniques described in this disclosure. As shown in the example of FIG. 6, the video decoder 30 may be configured to decode video data in accordance with the techniques of this disclosure.

The video decoder 30 may be configured to include a memory (e.g. DPB 1316 in FIG. 8) to store video data, and a processor that is configured to determine which picture is a collocated picture 250. In addition, the processor may be configured to determine a location of an associated block of the video data in the collocated picture at corresponds to the current block of video data in the current coding picture, based on using previously decoded blocks in the current coding picture to find an initial motion vector between the associated block in the collocated picture and the current block in the current coding picture, wherein the associated block of the video data includes at least one first derived motion vector 252. The processor may also be configured to determine the initial motion vector based on a decision check 254. The processor may also be configured to determine at least one second derived motion vector associated with the current block in the current coding picture based on the at least on first derived motion vector associated with the associated block in the collocated picture. The processor may also be configured to determine motion information of the current block of video data in the current coding picture 256, and use the determined motion information to obtain a prediction block, then generate a reconstructed block based on a combination of the prediction block and a residual block 258.

Figure 7:
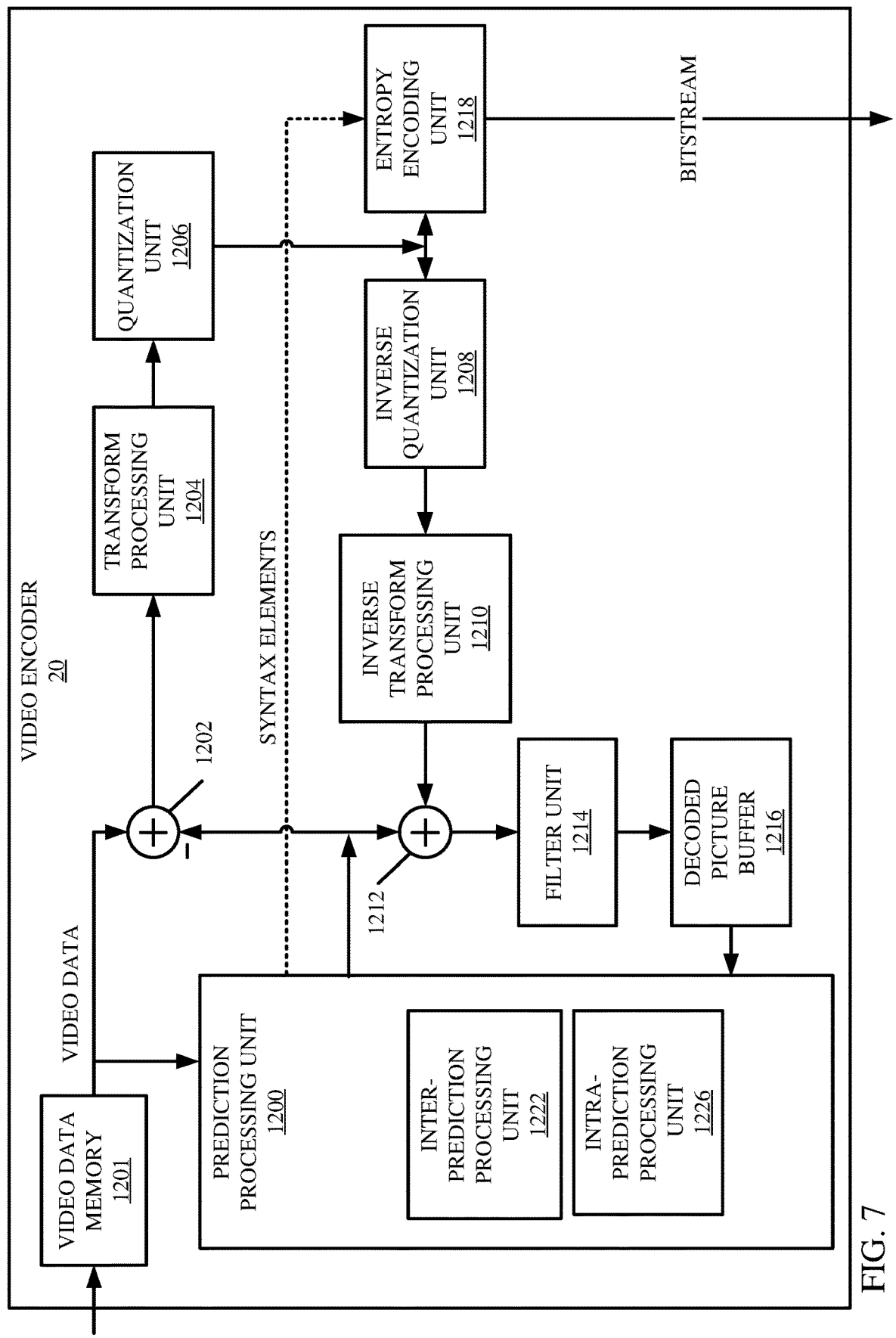
FIG. 7 is a block diagram illustrating an example video encoder that may implement one or more techniques described in this disclosure.

FIG. 7 is a block diagram illustrating an example video encoder 20 that may implement the techniques of this disclosure. FIG. 8 is provided for purposes of explanation and should not be considered limiting of the techniques as broadly exemplified and described in this disclosure. The techniques of this disclosure may be applicable to various coding standards or methods.

In the example of FIG. 7, video encoder 20 includes a prediction processing unit 1200, video data memory 1201, a residual generation unit 1202, a transform processing unit 1204, a quantization unit 1206, an inverse quantization unit 1208, an inverse transform processing unit 1210, a reconstruction unit 1212, a filter unit 1214, a decoded picture buffer 1216, and an entropy encoding unit 1218. Prediction processing unit 1200 includes an inter-prediction processing unit 1220.

Video data memory 1201 may be configured to store video data to be encoded by the components of video encoder 20. The video data stored in video data memory 1201 may be obtained, for example, from video source 18. Decoded picture buffer 1216 may be a reference picture memory that stores reference video data for use in encoding video data by video encoder 20, e.g., in intra- or inter-coding modes. Video data memory 1201 and decoded picture buffer 1216 may be formed by any of a variety of memory devices, such as dynamic random access memory (DRAM), including synchronous DRAM (SDRAM), magnetoresistive RAM (IMAM), resistive RAM (RRAM), or other types of memory devices. Video data memory 1201 and decoded picture buffer 1216 may be provided by the same memory device or separate memory devices. In various examples, video data memory 1201 may be on-chip with other components of video encoder 20, or off-chip relative to those components. Video data memory 1201 may be the same as or part of storage media 19 of FIG. 1.

The inter-prediction processing unit 1220 may generate predictive data for a current block. As part of generating the predictive data for a current block, inter-prediction processing unit 1220 may perform inter prediction on the current block. The predictive data for the current block may include predictive blocks of the current block and motion information for the current block as described above. Inter-prediction processing unit 1220 may apply the techniques for using the motion information of coded neighboring blocks to generate an initial motion vector, which may be used to point to the corresponding block in a collocated reference picture as described elsewhere in this disclosure.

The residual generation unit 1202 may generate the residual blocks of the current block such that each sample in the residual blocks has a value equal to a difference between a sample in a coding block of the current block and a corresponding sample in a corresponding selected predictive block of a current block.

The transform processing unit 1204 may perform partition the residual blocks of a current block into transform blocks of the current block. The quantization unit 1206 may quantize the transform coefficients in a coefficient block.

The inverse quantization unit 1208 and the inverse transform processing unit 1210 may apply inverse quantization and inverse transforms to a coefficient block, respectively, to reconstruct a residual block from the coefficient block. The reconstruction unit 1212 may add the reconstructed residual block to corresponding samples from one or more predictive blocks generated by the prediction processing unit 1200 to produce a reconstructed transform block associated with a current block. By reconstructing transform blocks for each current block in this way, video encoder 20 may reconstruct the coding blocks of the current block.

The filter unit 1214 may perform one or more deblocking operations to reduce blocking artifacts in the coding blocks associated with a current block. The decoded picture buffer 1216 may store the reconstructed coding blocks after filter unit 1214 performs the one or more deblocking operations on the reconstructed coding blocks. With the techniques described in this disclosure, the inter-prediction processing unit 1220 may use a collocated reference picture that contains the reconstructed coding blocks to perform inter prediction on current blocks of other pictures, instead of a reference picture that contains the reconstructed coding blocks to perform inter prediction on current blocks of other pictures. This allows for a memory efficient system, as the DPB 1216 does not have to store each reference index for each block coded.

The entropy encoding unit 1218 may receive data from other functional components of video encoder 20. For example, the entropy encoding unit 1218 may receive coefficient blocks from quantization unit 1206 and may receive syntax elements from prediction processing unit 1200. The entropy encoding unit 1218 may perform one or more entropy encoding operations on the data to generate entropy-encoded data. For example, the entropy encoding unit 1218 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. The video encoder 20 may output a bitstream that includes entropy-encoded data generated by entropy encoding unit 1218. For instance, the bitstream may include data that represents values of transform coefficients for a current block.

Various components of video encoder 20 may execute the techniques described herein and utilize the motion information of coded neighboring blocks to generate an initial motion vector, which may be used to point to the corresponding block in a collocated reference picture to encode video data. The video encoder 20 may then generate residual data using the predictive block and the current block.

FIG. 8 is a block diagram illustrating an example video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of JEM coding, and in the context to the proposal to improve JEM coding. However, the techniques of this disclosure may be applicable to other coding standards or methods.

In the example of FIG. 8, the video decoder 30 includes an entropy decoding unit 1300, video data memory 1301, a prediction processing unit 1302, an inverse quantization unit 1304, an inverse transform processing unit 1306, a reconstruction unit 1308, a filter unit 1310, and a decoded picture buffer 1312. The prediction processing unit 1302 includes a motion compensation unit 1314 and an intra-prediction processing unit 1316. In other examples, video decoder 30 may include more, fewer, or different functional components.

If a current block is encoded using inter prediction, motion compensation unit 1314 may determine motion information for the current block. The motion compensation unit 1314 may determine, based on the motion information of the current block, one or more previously decoded blocks in the current picture to find an initial motion vector between the associated block in the collocated reference picture and the current block in the current coding picture (i.e., decoding picture when referencing a decoding process by a decoding device), where the associated block of the video data includes at least one derived motion vector.

The motion compensation unit 1314 may apply the techniques for using the motion information of coded neighboring blocks to generate an initial motion vector, and determine at least one second derived motion vector associated with the current block in the current coding picture based on at least a first derived motion vector associated with the associated block in the collocated reference picture.

Moreover, the motion compensation unit 1314 may determine motion information of the current block of video data in the current coding picture based on the at least one second derived motion vector, and use the determined motion information to get a prediction block (or per color predictive blocks, i.e., luma, CB and Cr blocks).

The reconstruction unit 1308 may use transform blocks (e.g., luma, Cb and Cr transform blocks) for the current block, and the predictive blocks (e.g., luma, Cb and Cr blocks) of the current block, and generate a difference value (e.g., a residual block) to reconstruct the coding blocks (e.g., luma, Cb and Cr coding blocks) for the current block. The filter unit 1310 may perform a deblocking operation to reduce blocking artifacts associated with the coding blocks of the current block. The video decoder 30 may store the coding blocks of the current block in decoded picture buffer 1312.

In merge mode, the video decoder 30 may use the one or more motion vectors of the previously coded spatial neighbors for the current block into a unified merge candidate list for the current block. As such, in using use the motion information of coded neighboring blocks to generate an initial motion vector, which may be used to point to the corresponding block in a collocated reference picture for the current block, the video decoder 30 may use use the motion information of coded neighboring blocks to generate an initial motion vector, which may be used to point to the corresponding block in a collocated reference picture to generate the predictive block for the current block based on a first motion vector in the unified merge candidate list for the current block.

It should be noted that the techniques in this disclosure may be also applicable to an apparatus that includes means for decoding a current block of video data in a current coding picture, which includes means for determining which picture is a collocated picture, and means for determining a location of an associated block of the video data in the collocated picture that corresponds to the current block of video data in the current coding picture, based on using previously decoded blocks in the current coding picture to find an initial motion vector between the associated block in the collocated picture and the current block in the current coding picture, where the associated block of the video data includes at least one first derived motion vector; determining at least one second derived motion vector associated with the current block in the current coding picture, when the initial my points to the collocated picture, based on the at least on first derived motion vector associated with the associated block in the collocated picture. The apparatus may also include means for determining motion information of the current block of video data in the current coding picture based on the at least one second derived motion vector, means for using the determined motion information to obtain a prediction block, and means for generating a reconstructed block based on a combination of the prediction block and a residual block.

The techniques described in this disclosure may be useful for other video coding processes, including other standard or proprietary video coding processes presently under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable; fiber optic cable, twisted pair; DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A device for decoding a current block of video data in a current coding picture, the device comprising:
   a memory configured to store video data; and
   a processor configured to: receive bits in a bitstream to indicate a mode is an advanced temporal motion vector prediction (ATMVP) mode;
   determine which picture is a collocated reference picture in the ATMVP mode;
   based on the determination there is a collocated reference picture, perform a decision check, in the ATMVP mode, to (a) determine if the collocated reference picture is the same as (b) a reference picture based on one or more previously decoded spatial neighboring blocks in the current coding picture to (c) determine an initial motion vector between an associated block in the collocated reference picture and the current block in the current coding picture, to determine a location of the associated block of the video data in the collocated reference picture that corresponds to the current block of the video data in the current coding picture based on the initial motion vector determined based on the decision check, where the associated block of the video data of the current bock includes more than one first derived motion vector, wherein each associated block in the collocated reference picture includes more than one motion vector, and wherein the associated block in the collocated reference picture includes M sub-blocks with the more than one first derived motion vector, where M>1;
   determine at least one second derived motion vector associated with the current block in the current coding picture, when the initial motion vector points to the collocated reference picture, based on the more than one first derived motion vector associated with the associated block in the collocated reference picture;
   determine motion information of the current block of the video data in the current coding picture based on the at least one second derived motion vector includes association of M sub-blocks from the collocated reference picture with M different motion vectors to determine M motion vectors of M sub-blocks of the current block in the ATMVP mode, based on the M sub-blocks from the collocated reference picture to obtain a prediction block; and
   generate a reconstructed block based on a combination of the prediction block and a residual block.

2. The device of claim 1, wherein the collocated reference picture is a reference picture with a reference index.

3. The device of claim 2, wherein the reference index is 0.

4. The device of claim 1, wherein the more than one first derived motion vector of the associated block is in the collocated reference picture and is scaled according to a picture order count of the current block relative to the collocated reference picture.

5. The device of claim 1, wherein the one or more previously decoded spatial neighboring blocks are merge candidates.

6. The device of claim 1, where if more than one merge candidate is available the decision check depends on an order of candidates in a merge candidate list.

7. The device of claim 6, where if more than one merge candidate is available, a temporal candidate in a previously decoded picture is checked before a spatial candidate in the current coding picture.

8. The device of claim 6, where if more than one merge candidate is available, a spatial candidate in the current coding picture is checked before a temporal in a previously decoded picture.

9. The device of claim 1, wherein the one or more previously decoded spatial neighboring blocks of the current picture not merge candidates.

10. The device of claim 1, wherein the decision check to a) determine if the collocated reference picture is the same as (b) the reference picture based on one or more previously decoded spatial neighboring blocks in the current coding picture is based on a fixed order of the one or more previously decoded spatial neighboring blocks prior to the current block of the current picture of the video data.

11. The device of claim 10, wherein the fixed order is equal to one previously decoded spatial neighboring block, in the one or more previously decoded spatial neighboring blocks.

12. The device of claim 1, wherein the decision check to find the initial motion vector comprises a scale of other motion vectors that are not the one or more previously decoded neighboring spatial blocks of the current block in the current coding picture.

13. The device of claim 1, wherein the decision check to find the initial motion vector comprises using a default motion vector to point to the collocated reference picture.

14. The device of claim 1, wherein the one or more previously decoded spatial neighboring blocks are not merge candidates in a merge mode.

15. The device of claim 1, wherein the one or more previously decoded spatial neighboring blocks are merge candidates in a merge mode.

16. The device of claim 1, wherein the initial motion vector is an average value of motion vectors of at least two previously decoded spatial neighboring blocks of the one or more previously decoded spatial neighboring blocks.

17. The device of claim 1, wherein the initial motion vector is a median value of motion vectors of at least three previously decoded spatial neighboring blocks of the one or more previously decoded spatial neighboring blocks.

18. The device of claim 1, wherein the initial motion vector is based on a comparison of at least two motion vectors of the one or more previously decoded spatial neighboring blocks.

19. A method for decoding a current block of video data in a current coding picture, comprising:
receiving bits in a bitstream to indicate a mode is an advanced temporal motion vector prediction (ATMVP) mode;
determining which picture, from the bitstream, is a collocated reference picture in the ATMVP mode;
based on the determining there is a collocated reference picture, performing a decision check, in the ATMVP mode, (a) to determine if the collocated reference picture is the same as (b) a reference picture based on one or more previously decoded spatial neighboring blocks in the current coding picture, and in response to the decision check determining (c) an initial motion vector between an associated block in the collocated reference picture and the current block in the current coding picture, to determine a location of the associated block of the video data in the collocated reference picture that corresponds to the current block of the video data in the current coding picture based on the initial motion vector determined based on the decision check, where the associated block of the video data of the current block includes more than one first derived motion vector, wherein each associated block in the collocated reference picture includes more than one motion vector, and wherein the associated block in the collocated reference picture includes M sub-blocks with the more than one first derived motion vector, where M>1;
determining at least one second derived motion vector associated with the current block in the current coding picture, when the initial motion vector points to the collocated reference picture, based on the more than one first derived motion vector associated with the associated block in the collocated reference picture; and
determining motion information of the current block of the video data in the current coding picture based on the at least one second derived motion vector includes association of the M sub-blocks from the collocated reference picture with M different motion vectors to determine M motion vectors of M sub-blocks of the current block in the ATMVP mode, based on the M sub-blocks from the collocated reference picture to obtain a prediction block; and
generating a reconstructed block based on a combination of the prediction block and a residual block.

20. The method of claim 19, wherein the at least one second derived motion vector points to a picture based on inter-direction.

21. The method of claim 19, wherein the collocated reference picture is a reference picture with a reference index.

22. The method of claim 19, wherein the reference index is 0.

23. The method of claim 19, wherein the decision check to find the initial motion vector is based on a check if a motion vector of the one or more previously decoded spatial neighboring blocks are in the current coding picture.

24. The device of claim 1, further comprising a decoder reference buffer that includes the first motion vectors associated with sub-blocks in the collocated reference picture that are no larger than a fixed size.

25. The device of claim 24, wherein the fixed size is smaller than 32×32.

26. The device of claim 25, wherein the fixed size is 16×16.

27. The method of claim 19, wherein the decision check to a) determine if the collocated reference picture is the same as (b) the reference picture based on one or more previously decoded spatial neighboring blocks in the current coding picture is based on a fixed order of the one or more previously decoded spatial neighboring blocks prior to the current block of the current picture of the video data.

28. The method of claim 19, wherein the fixed order is equal to one previously decoded spatial neighboring block, in the one or more previously decoded spatial neighboring blocks.

29. The device of claim 1, wherein the decision check to find the initial motion vector comprises a scale of other motion vectors that are not the one or more previously decoded neighboring spatial blocks of the current block in the current coding picture.

30. The method of claim 19, wherein the decision check to find the initial motion vector comprises using a default motion vector to point to the collocated reference picture.

\* \* \* \* \*